March 12, 1935. M. S. ZISKIN ET AL 1,994,331

APPARATUS FOR EVAPORATING LIQUIDS

Filed May 13, 1931

INVENTORS
Manuel S. Ziskin and
Victor H. Zeve.
BY Fay, Oberlin & Fay
ATTORNEYS.

Patented Mar. 12, 1935

1,994,331

UNITED STATES PATENT OFFICE 1,994,331

APPARATUS FOR EVAPORATING LIQUIDS

Manuel S. Ziskin and Victor D. Zeve, Cleveland, Ohio, assignors to V. D. Zeve, Inc., Cleveland, Ohio, a corporation of Ohio Application May 13, 1931, Serial No. 537,056

7 Claims. (Cl. 219—40)

The present invention, relating as indicated to a method of and apparatus for evaporating liquids, is more particularly directed to a new and improved method of progressively heating to evaporation a selected or minimum quantity of liquid drawn from a larger body of liquid and to an apparatus for simply and economically carrying out the method referred to. A further object of the invention is the provision of an extremely simple and inexpensive device for evaporating water for the boiling or poaching of eggs, for example, the heating of a larger body of liquid for various purposes and the liquefying and subsequent evaporation of solids, such for example as are used as inhalants.

To the accomplishment of the foregoing and related ends, said invention, then, consists of the means hereinafter fully described and particularly pointed out in the claims; the annexed drawing and the following description setting forth in detail certain means and one mode illustrating, however, but one of various ways in which the principle of the invention may be used.

In said annexed drawing:—

Figure 1:
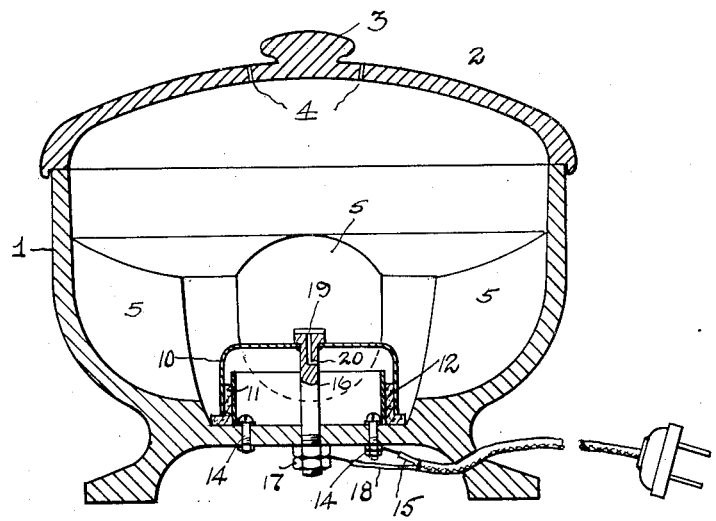
Figure 2:
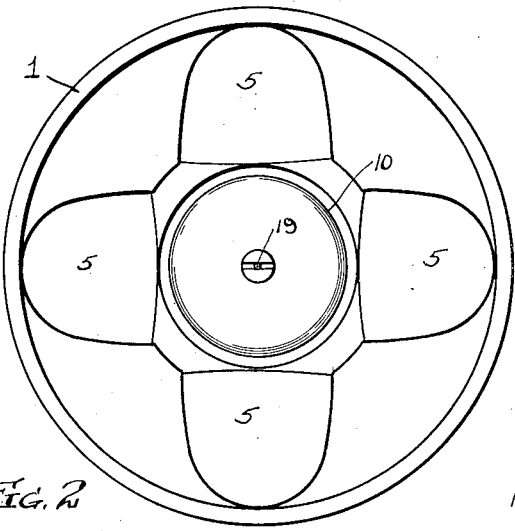
Figure 5:
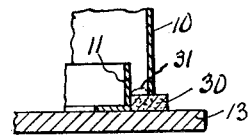
Figure 4:
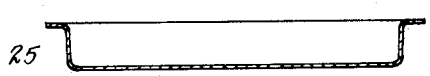
Figure 3:
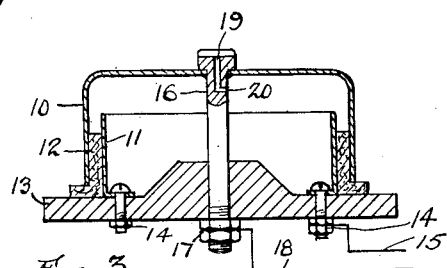

Fig. 1 is a transverse vertical section through one form of apparatus embodying my invention; Fig. 2 is a plan view of the same with the cover removed; Fig. 3 is a transverse central section through one form of heating unit adapted for use in the apparatus illustrated in the previous figures; Fig. 4 is a transverse central section through a removable receptacle to be introduced into the main receptacle for the poaching of eggs or other similar purposes; and Fig. 5 is a partial transverse central section showing a modification of the electrodes and interposed wick.

Referring now to Figs. 1, 2 and 3 particularly, the form of apparatus there shown consists of an open, preferably cylindrical receptacle 1 provided with a removable cover 2 having a handle 3 and one or more escape vents 4. The receptacle shown in Figs. 1 and 2 is particularly adapted to the boiling of eggs and is hence provided with a plurality of recesses 5 formed in the walls, each of which recesses is adapted to receive a single egg. Obviously the number of such recesses may be varied as required within the limits of the size of the receptacle.

It will be obvious that any suitable material may be employed, both for the receptacle proper and for the cover, but I prefer to employ a moldable material of heat and liquid-proof composition, at least for the base or receptacle proper, which will be unbreakable and which can be simply and inexpensively molded from plastic material. Such a composition, for example, may consist of finely ground wood flour and a suitable heat-proof and water-proof binder or adhesive.

Mounted in the central body portion of the receptacle is the liquid-heating or evaporating unit, which for convenience is formed as a separate device and then assembled into the receptacle. This heating or evaporating device consists of a cap 10 formed of metal and constituting one of the electrodes, a second electrode in the form of a cylindrical element 11, and a wick of liquid-absorbent material 12 extending between the electrodes 10 and 11 and under the edge of the electrode 10 into the space outside of the heating device. The inner electrode 11 is secured to the base 13 of the heating unit by means of one or more screws 14, of which one also acts as a connection for a conductor 15 of an electrical circuit. It will be understood that the base 13 may either be a separate member or may be the bottom of the receptacle 1, as may be most convenient.

The other electrode 10 is electrically connected and mechanically secured in any suitable way to a bolt 16 extending centrally through the base 13 and terminating below the same, where it is held by means of a nut 17, which also holds in electrical connection to the bolt a conductor 18 of an electrical circuit. The bolt 16 may of course equally well serve to connect the electrode 10 to the bottom of the receptacle as to a separate base member 13. The bolt 16 is provided with a relatively small central passage 19 having an opening 20 extending laterally and connecting the passage 19 with the interior of the chamber formed between the base 13 and the cap 10.

In operation, one or more eggs or other articles to be heated and steamed are placed in the recesses 5 of the receptacle, after which any given quantity of liquid is poured into the receptacle in the space between the side walls thereof and the cap or electrode 10. The cover is of course placed on the receptacle and the liquid placed therein at once flows or is drawn through the wick member 12 into the space between the electrodes 10 and 11. The electrodes 10 and 11, through the conductors 14 and 15 are in permanent connection with an electrical circuit. Entrance of liquid into the space filled by the wick between the two electrodes closes the electrical circuit and causes a current to flow from one electrode to the other through the wick and through the liquid contained therein. The current flowing through the circuit is thus concentrated against a relatively small amount of liquid and practically instantaneously heats the same to the boiling point, causing the liquid to evaporate and flow up between the electrodes into the chamber under the cap 10. The relatively small passage leading out of this chamber through the bolt 16 produces a small head on the steam, causing it to issue with some velocity and rapidly fill the interior of the chamber, warming the eggs or other articles and rapidly cooking these. Excess steam escapes through the vent 4 in the cover, a certain amount of steam of course condensing upon the walls of the receptacle and cover and gradually flowing down into the bottom of the receptacle, where it is again heated and evaporated as it passes through the wick. The device thus operates continuously until all of the liquid has been evaporated and the evaporation of the liquid in the base of the receptacle opens the circuit and stops the flow of current.

By insetting the open receptacle 25, shown in Fig. 4, in the main receptacle 1 eggs can be poached by breaking them into this inset receptacle and causing the device to operate as before, the steam heating the inset receptacle and surrounding and cooking the eggs. Upon completion of the cooking operation the inset receptacle can be removed and the eggs removed from it.

In Fig. 5 I have shown a modification of the electrodes and wick construction, in which the electrodes 10 and 11 are constructed as illustrated in the previous figures, but the wick 30 is merely a cylindrical strip of rectangular cross-section fitting snugly against and outside of the electrode 11. The electrode 10 is then rested upon the upper surface of the wick 30 and may be drawn down by adjustment of the bolt 16 and nut 17 to apply varying degrees of pressure to the wick and to cause the latter to bulge up between the electrodes in the manner indicated in the dotted lines 31 in Fig. 5. The variation of pressure applied to the wick in this manner acts to control the flow of liquid through the wick, and hence the rate of evaporation. It also controls the current flow and tends to prevent undue initial surges of current.

It will be understood that the present invention may take various mechanical forms other than that here shown, and may be employed for numerous purposes other than that of cooking eggs, or even other foods, and numerous uses will occur to those skilled in the various arts. Our method and apparatus present an extremely inexpensive and rapid means for evaporating liquid and for utilizing the liquid in a confined space.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:—

1. In apparatus of the character described, the combination of a receptacle, concentric spaced electrodes mounted in a liquid-receiving portion thereof, a wick disposed between said electrodes, circuit connections for said electrodes, and means for transmitting the vapor produced between said electrodes from contact with the unvaporized liquid.

2. In apparatus of the character described, the combination of a receptacle, an electrode mounted in a liquid-receiving portion thereof, a second electrode disposed adjacent said first-named electrode and provided with a chambered portion, and a wick disposed between said electrodes and extending into the liquid-receiving portion of said receptacle.

3. In apparatus of the character described, the combination of a receptacle, a cylindrical electrode mounted in a liquid-receiving portion thereof, a second cylindrical electrode disposed concentrically about and in spaced relation to said first-named electrode and provided with a chamber portion, and a wick disposed between said electrodes and extending into the liquid-receiving portion of said receptacle.

4. In apparatus of the character described, the combination of a receptacle, a cylindrical electrode mounted in the bottom of a liquid-receiving portion thereof, means securing said electrode to said receptacle and constituting an external electrical connection therefor, a second cylindrical electrode surrounding said first-named electrode and provided with an apertured dome constituting a vapor-receiving chamber, means securing said second electrode to said receptacle and constituting an electrical connection therefor, and a wick disposed between said electrodes and extending into the liquid-receiving portion of said receptacle.

5. In apparatus of the character described, the combination of a receptacle, a cylindrical electrode mounted in the bottom of a liquid-receiving portion thereof, means securing said electrode to said receptacle and constituting an external electrical connection therefor, a second cylindrical electrode surrounding said first-named electrode and provided with an apertured dome constituting a vapor-receiving chamber, an apertured bolt securing said second electrode to said receptacle, said bolt also constituting an external electrical connection for said second electrode and being also adapted to vent the interior of said dome into the receptacle, and a wick disposed between said electrodes and extending into the liquid-receiving portion of said receptacle.

6. In apparatus of the character described, the combination of a molded unitary receptacle provided with a liquid-receiving bottom portion, a recess disposed above said liquid-receiving portion and adapted to receive an article to be heated, spaced electrodes mounted in the liquid-receiving portion of said receptacle, electrical connections therefor, and a wick disposed between said electrodes and adapted to receive liquid, thereby closing the circuit through said two electrodes.

7. As a new article of manufacture, a molded unitary open receptacle provided with a series of lateral recesses disposed above the bottom portion of said receptacle and spanning the major portion of the distance between the center and the side walls of said receptacle.

MANUEL S. ZISKIN.
VICTOR D. ZEVE.